April 8, 1952　　　　J. D. KEMP ET AL　　　　2,592,428
POLYMERIZATION OF PROPYLENE WITH LIQUID PHOSPHORIC ACID
Filed June 4, 1949　　　　　　　　　　　　　　2 SHEETS—SHEET 1

INVENTORS
JACOB D. KEMP
LLOYD F. BROOKE
ATTORNEYS OR AGENTS

INVENTORS
JACOB D. KEMP
LLOYD F. BROOKE

Patented Apr. 8, 1952

2,592,428

UNITED STATES PATENT OFFICE 2,592,428

POLYMERIZATION OF PROPYLENE WITH LIQUID PHOSPHORIC ACID

Jacob D. Kemp, Richmond, and Lloyd F. Brooke, Berkeley, Calif., assignors to California Research Corporation, San Francisco, Calif., a corporation of Delaware Application June 4, 1949, Serial No. 97,283

2 Claims. (Cl. 260—683.15)

This invention relates to an improved process for the polymerization of propylene in the presence of a liquid phosphoric acid catalyst.

Propylene is recognized to be more difficult to polymerize than isobutene or the normal butenes, and, accordingly, severe conditions heretofore have been prescribed for its polymerization. When the polymerization catalysts in current commercial use are employed to polymerize propylene, temperatures on the order of 400° F. and higher are employed in order to obtain reasonably high conversions at moderate space rates. The employment of such temperatures results in the production of saturates, polyolefins and alkyl aromatics in the polymer product which are objectionable whether it is used as motor fuel or in the manufacture of chemicals.

It is the object of the present invention to provide a process whereby propylene is polymerized at temperatures below 300° F., employing high space velocities and obtaining high conversions of propylene to the desired polymer products.

In the practice of this invention, a normally gaseous hydrocarbon mixture having a substantial content of propylene is introduced in liquid phase and under an elevated pressure into a body of liquid phosphoric acid and is vigorously mixed with the acid at a temperature maintained within the range 225° F. to 300° F., preferably under the following described conditions in the polymerization zone. The concentration of the phosphoric acid is maintained above about 100% ortho-phosphoric acid, and the reaction pressure is maintained above 200 p. s. i. g. Propylene is contacted with the acid at a rate of at least 0.15 volumes of liquid propylene per volume of acid per hour, and conversion of propylene to liquid polymer product is substantially in excess of 50% and usually in excess of 80% in a single pass operation.

That propylene can be polymerized in this manner is quite unexpected in the light of present knowledge. Heretofore it has been stated on apparently good authority that in the polymerization of propylene, no technically useful reaction can be obtained below 150° C., and all existing commercial processes for its polymerization are conducted at temperatures substantially above 150° C.

Figure 1:
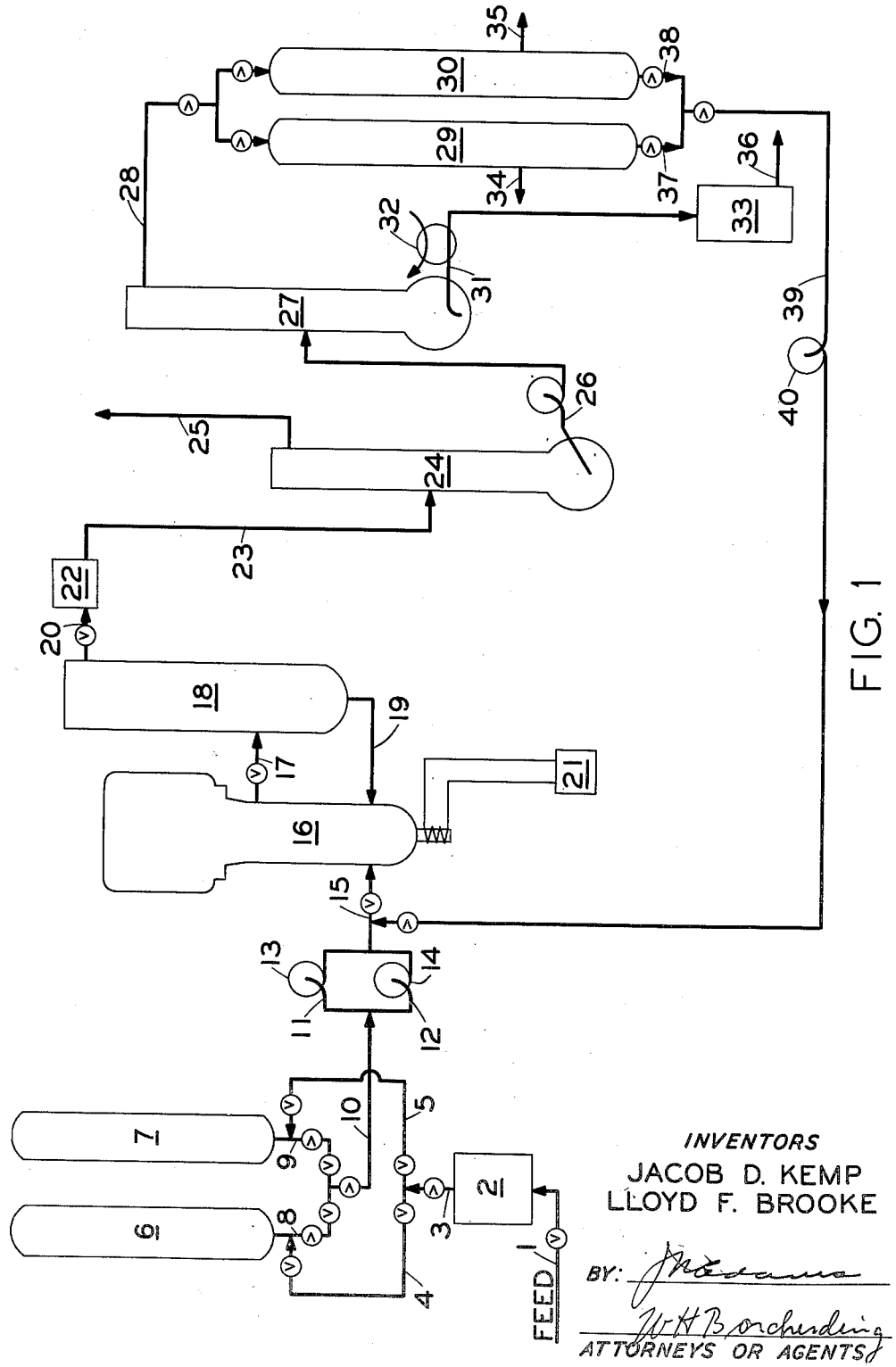
Figure 2:
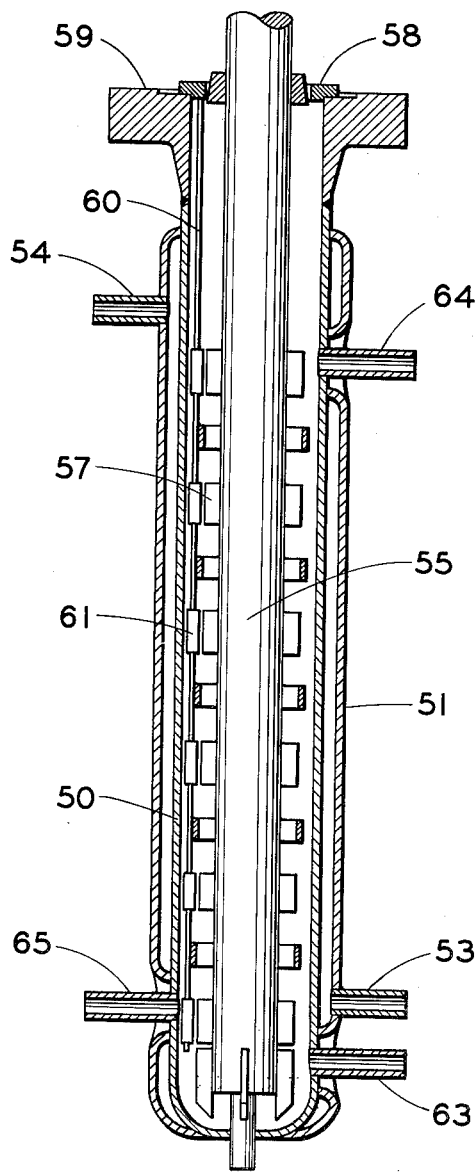

The process of the invention may be readily understood by reference to the appended drawings of which Figure 1 is a diagrammatic illustration of apparatus and process flow suitable for the practice of the invention and Figure 2 is a more detailed illustration of a reaction vessel which may be employed in the practice of the invention.

Referring now to Figure 1, a feed consisting of propylene or a propylene-propane mixture in liquid phase is introduced by line 1 into drier 2 which is packed with calcium chloride. In drier 2 the water content is reduced to substantially less than one-half of the amount which would saturate the feed at 70° F. The dried feed is passed from drier 2 through line 3 and either of lines 4 and 5 into feed blowcases 6 or 7 respectively. Feed is withdrawn from either blowcase 6 or blowcase 7 through line 8 or line 9 respectively and is passed through lines 10, 11 and 12, pumps 13 and 14, and line 15 into reactor 16. Feed is withdrawn from blowcase 6 while blowcase 7 is being filled or vice versa. Reactor 16 contains concentrated phosphoric acid and in it the acid and feed are vigorously and intimately mixed. A mixture of hydrocarbon and acid is withdrawn from reactor 16 through line 17 and passed into settler 18 where the mixture is settled to form an upper hydrocarbon layer and a lower acid layer. The acid layer is continuously returned to reactor 16 through line 19, and the hydrocarbon layer is continuously withdrawn through line 20. Electromagnetic R. P. M. indicator 21 indicates the degree of agitation to which the acid and hydrocarbon in reactor 16 is subjected. The hydrocarbons withdrawn from settler 18 through line 20 pass through pressure regulator 22 entering regulator 22 at an elevated pressure above 200 p. s. i. a. and leaving it at about atmospheric pressure. The entire flow system from the point of feed introduction in line 1 to the point of hydrocarbon withdrawal through regulator 22 is maintained under an approximately uniform elevated pressure above about 200 p. s. i. a. The hydrocarbons withdrawn from settler 18 are passed from pressure regulator 22 through line 23 into distillation column 24 where the hydrocarbons are depropanized. Propane and lighter gases are withdrawn from column 24 through line 25 and the heavier hydrocarbons consisting essentially of propylene polymers are withdrawn from the bottom of column 24 through line 26 and pumped into re-run still 27 where the polymers are fractionally distilled. A lighter overhead fraction is withdrawn from column 27 through line 28 and passed into storage vessels 29 and 30. A heavier bottoms fraction is withdrawn from column 27 and passed through line 31 and heat exchanger 32 to storage vessel 33. Products may be withdrawn through lines 34, 35 and 36 at storage vessels 29, 30 and 33 respectively. If it is desired to increase the yield of propylene tetramer and heavier propylene polymers, an overhead fraction is taken from distillation column 27 which has an end point of about 350° F. A part or all of this overhead is then passed from storage vessels 29 or 30 through the appropriate line 37 or 38 and through line 39 and pump 40 into line 15 and thence into reactor 16. Recycle of the lighter polymer in this manner increases production of heavier polymer boiling above about 350° F.

Figure 2 is a diagrammatic cross-section of reactor 16 showing the reactor in more detail. The reactor is constructed entirely from Monel metal. Reactor shell 50 is three inches in inside diameter and twenty-four inches long. The lower portion of the shell is surrounded by jacket 51 which is spaced from shell 50 to permit circulation of a refrigerant between the shell and the jacket. Refrigerant is introduced into the refrigeration space through inlet 53 and is withdrawn at outlet 54. Strip heaters not shown surround the exterior of jacket 51. These heaters have a constant heat capacity and supply heat at a constant rate. Temperature variations in the reaction space are controlled by varying the rate at which the refrigerant is introduced into and withdrawn from the space between jacket 51 and shell 50. Stirrer shaft 55 is 1½″ in diameter and is centered in the reactor shell and journaled into the base of the shell. The journal bearing maintains the shaft in properly centralized position for rotation and guides it. Six sets of blades 57 are mounted on stirrer shaft 55 in opposing pairs. The blades are one inch wide, spaced two inches vertically from each other and extend laterally from the shaft $\frac{15}{32}$ of an inch. Ring 58 rests on shoulder 59. Three rods 60 depend vertically from ring 58. The rods 60 are spaced 120° apart. Vanes 61 are attached to the rods 60 and spaced on the rods so as to be horizontally opposite to blades 57. The clearance between stationary vanes 61 and blades 57 is $\frac{1}{32}$ inch. Appropriate packing for shaft 55 and locking means to hold ring 58 in position are provided and may be bolted to annular shoulder 59. Suitable driving means to rotate stirrer shaft 55 at speeds up to 3,000 R. P. M. is provided, for example, an induction stirrer head similar to that shown in U. S. Patent 2,377,937 may be bolted to shoulder 59. Feed is introduced at feed inlet 63 and a mixture of acid and hydrocarbon is withdrawn at outlet 64 and passed to a settler. The acid phase from the settler is reintroduced into the reactor through acid return inlet 65. The volume of the reactor with the stirrer and stationary vanes in place is about 1,430 cc. measured from the bottom of the reactor to outlet 64.

A series of batch runs were made in the apparatus illustrated diagrammatically in Figure 2 in which propylene was contacted with liquid phosphoric acid and in which acid concentration, temperature, pressure, and space velocity were varied. The results of these runs are summarized in Table I. In all of the runs, normally gaseous hydrocarbons consisting essentially of propylene were liquefied and introduced in liquid phase into a body of liquid phosphoric acid. The acid and hydrocarbons were vigorously mixed by rotating the stirrer shaft at about 2,000 R. P. M. Introduction of propylene was continuous during the time indicated for each run in Table I. When introduction of the propylene was completed the reactor was cooled, depressured and opened. The acid and polymer product were separated and the product was inspected. All acid concentrations indicated in Table I are expressed as per cent orthophosphoric acid; the values are obtained by titrating a weighed sample of the acid catalyst, calculating its equivalent weight of orthophosphoric acid and dividing this equivalent weight by the weight of the sample. All space velocities are expressed as volumes of liquid propylene per volume of catalyst per hour.

*Table I*

| Run number | 3-0-81 | 3-0-85 | 3-0-91 | 3-0-18 | F-1-151 | 3-0-77 | 3-0-71 | 3-0-65 | F-1-229 |
|---|---|---|---|---|---|---|---|---|---|
| Operating Conditions: | | | | | | | | | |
| Temperature, °F | 300 | 250 | 200 | 200 | 225 | 300 | 250 | 300 | 250 |
| Pressure Range, p. s. i. | 210-355 | 240-380 | 200-375 | 200-410 | 200-350 | 200-335 | 200-520 | 220-540 | |
| Average Feed Rate, gr./min | 5.82 | 5.70 | 1.32 | 0.536 | 0.75 | 11.82 | 1.27 | 11.9 | 5.53 |
| Average Space Rate (liq. v./v./hr.) | 1.39 | 1.35 | 0.33 | 0.10 | 0.15 | 2.73 | 0.29 | 2.69 | 1.17 |
| Time of Olefin Addition, min | 85 | 79 | 340 | 783 | 585 | 38 | 350 | 39 | 79 |
| Feed: | | | | | | | | | |
| $H_3PO_4$ added, grams | 1,168 | 1,229 | 1,194 | 1,168 | 1,172 | 1,126 | 1,160 | 1,093 | 1,111 |
| Weight Per Cent of Total Charge | 69 | 72 | 71.5 | 72 | 71.2 | 70.4 | 71.2 | 69 | 70.7 |
| Specific Gravity | 2.05(78°) | 2.05(78°) | 2.05(78°) | 1.91(80°) | 1.91(78°) | 1.87(76°) | 1.877(76°) | 1.81(78°) | 1.81(78°) |
| Per Cent $H_3PO_4$ | 110.8 | 110.4 | 110.3 | 102.8 | 102.8 | 100.4 | 100.5 | 94.8 | 94.8 |
| Propylene Feed, grams | 523 | 475 | 475 | 453 | 473 | 474 | 470 | 490 | 461 |
| Weight Per Cent of Total Charge | 29.3 | 26.4 | 27 | 25.9 | 26.6 | 28 | 27.3 | 29.3 | 27.8 |
| Analysis of Propylene: | | | | | | | | | |
| Weight Per Cent Propylene | 94.7 | 94.7 | 94.7 | 92.75 | 92.75 | 94.7 | 94.7 | 94.7 | 94.7 |
| Weight Per Cent Propane | 4.6 | 4.6 | 4.6 | 5.34 | 5.34 | 4.6 | 4.6 | 4.6 | 4.6 |
| Weight Per Cent Miscellaneous | 0.7 | 0.7 | 0.7 | 1.91 | 1.91 | 0.7 | 0.7 | 0.7 | 0.7 |
| Product Distribution: | | | | | | | | | |
| Weight of Acid Phase, grams | 1,169 | 1,230 | 1,388 | 1,490 | 1,317 | 1,162 | 1,228 | 1,277 | 1,482 |
| Specific Gravity (final) | 1.91(79°) | 1.925(78°) | 1.57(81°) | 1.425(74°) | 1.57(79°) | 1.775(79°) | 1.707(79°) | 1.485(79°) | 1.35(79°) |
| Per Cent $H_3PO_4$ | 106.7 | 109 | 89.9 | 77.4 | 87.6 | 95.8 | 93.8 | 79.9 | 70 |
| Weight Increase of Acid Phase | 1.0 | 1.0 | 194 | 322 | 145 | 36 | 68 | 184 | 371 |
| Weight Decrease of Acid Phase | | | | | | | | | |
| Weight of Polymer Phase | 445 | 422 | 219 | 70 | 238 | 390 | 375 | 240 | 22.0 |
| API Gravity (60°) | 51.3 | 49.3 | 49.8 | 50.3 | 50.1 | 52.8 | 51.4 | 55.5 | 54.5 |
| Bromine Number | 85 | 80 | 94 | 94 | 89 | 106 | 97 | 122 | 114 |
| Molecular Weight | 172 | 188 | 183 | 179 | 180 | 165 | 174 | 145 | |
| Weight Per Cent Conversion | 89.9 | 93.8 | 48.7 | 16.7 | 54.3 | 86.9 | 84.3 | 51.7 | 5.0 |
| Boiling Range of Polymer: | | | | | | | | | |
| 0-212° F | 1.0 | 0.0 | 0.0 | 0.0 | 0.0 | 0.0 | 0.0 | 2.0 | (²) |
| 212-257° F | 7.5 | 1.0 | 0.0 | 0.8 | 0.6 | 2.7 | 0.6 | 2.4 | (²) |
| 257-302° F | 7.5 | 3.6 | 14.2 | 16.9 | 12.0 | 23.2 | 13.9 | 54.0 | (²) |
| 302-347° F | 12.6 | 6.2 | 2.6 | 3.0 | 3.4 | 7.8 | 4.6 | 4.0 | (²) |
| 347-392° F | 22.0 | 17.8 | 29.4 | 28.1 | 35.0 | 32.4 | 38.3 | ¹23.2 | (²) |
| 392-437° F | 15.5 | 19.2 | 8.8 | 9.1 | 10.0 | 14.8 | 13.9 | | (²) |
| 437-482° F | ¹9.3 | ¹22.8 | ¹23.8 | ¹24.6 | ¹25.6 | ¹4.8 | ¹9.6 | | (²) |
| Bottoms | 24.6 | 29.8 | 21.2 | 17.5 | 13.4 | 14.4 | 19.1 | 14.3 | (²) |
| Maximum Temperature, °F | ¹458 | ¹482 | ¹467 | ¹473 | ¹460 | ¹449 | ¹460 | ¹383 | |
| Weight of Hydrocarbon in $CO_2$ Trap | 21 | 10 | 16 | 20 | 12 | 22 | 11 | 48 | 47 |
| Weight Per Cent Hydrocarbon Recovery | 89.3 | 91.2 | 90.3 | 89.4 | 83.7 | 94.5 | 96.6 | 96.3 | 95.4 |

¹ Average Space Rates, Feed Rates, Weight Per Cent Conversions, and Weight Per Cent Propylene of Total Charge are Based on Propylene Content Only.
² No sample sent for T. B. P.

The data summarized in the following Table II were obtained in a series of continuous runs made in the apparatus illustrated in Figure 1.

Table II

| Run No. | 3-0-18 | F-5 | F-6A | F-6B | F-9A |
|---|---|---|---|---|---|
| Temperature, °F | 250 | 300 | 300 | 300 | 300 |
| Pressure, lbs. gage | 740 | 365 | 350 | 350 | 360 |
| Percent $H_3PO_4$ in Charge Acid | 103 | 103.8 | 103.5 | 103.5 | 103.2 |
| Percent $H_3PO_4$ in System Acid: | | | | | |
|   At End of Period | 96 | | 100.9 | 99.8 | 96.3 |
|   At End of Run | | 102 | | | |
| Type of Operation: | | | | | |
|   Complete Liquid Contact | Yes | No | No | No | No |
|   Partial Vaporization in Reactor | | Yes | Yes | Yes | Yes |
| Volume of Charge Acid, cc | 805 | 710 | 675 | 675 | 445 |
| Weight of Charge Acid, grams | 1,535 | 1,355 | 1,290 | 1,290 | 850 |
| Liquid Volume Percent Propylene in Feed | 28.2 | 22.2 | 29.6 | 29.6 | 42.5 |
| Gas Volume Percent Propylene in Feed | 29.7 | 23.1 | 31.1 | 31.1 | 44.2 |
| Hours Operation | 18.5 | 5.6 | 0-2.75 | 2.75-10.6 | 0-31.3 |
| Rates, cc./hr.: | | | | | |
|   Propylene | 368 | 1,150 | 1,552 | 640 | 757 |
|   Light Polymer Recycle | None | None | None | 304 | 481 |
| Volumes Recycle per Vol. Propylene | | | | 0.48 | 0.63 |
| End Point of Light Recycle, °F | | | 384 | 384 | 351, TBP |
| Initial B. P. of Heavy Polymers, °F | | | 385 | 385 | 318, TBP |
| Vol. Propylene/Vol. Acid/hr | 0.46 | 1.62 | 2.21 | 0.95 | 1.70 |
| Gas Vol. Percent Propylene in Exit Gas | 4.1 | 7.8 | 11.6 | 6.6 | 10.4 |
| Percent Propylene Converted: | | | | | |
|   Based on Actual Feed Comp | 90.0 | 71.8 | 71.0 | 84.4 | 85.2 |
|   Based on 45% Propylene Feed | 94.8 | 89.7 | 84.0 | 91.4 | 85.8 |

From the tabulated data and additional data from similar runs, it is found that at temperatures below 225° F. conversion is low even at low space rates and high acid concentrations. At temperatures above 300° F., the rate at which the acid attacks and corrodes metallic materials suitable for reactor construction is substantially higher, and, as indicated above, the content of saturates, polyolefins and alkyl aromatics in the reaction product is increased. Accordingly it is highly advantageous to conduct the reaction at a temperature in the range 225-300° F., especially at about 250° F.

When the concentration of the acid catalyst is below 100%, conversion is relatively low even at 300° F. Acid concentrations of 100% to 116% may be employed satisfactorily in the process, but acid concentrations in the range 103%-110% are preferred. Corrosion is less severe with acids of 103-110% concentration than with less concentrated acids. The maximum effective catalytic activity of the acid occurs in the range 103-110% and activity does not increase appreciably between 110% and 116%.

Propylene conversions above 50% can be obtained with 100% acid at 225° F. and a space velocity of 0.15 volumes of liquid propylene per volume of acid per hour. As either acid strength or temperature or both are increased within the respective ranges 110-116% and 225-300° F., conversions above 75% may be obtained at space velocities above 0.2 v./v./hr. and up to 6 v./v./hr.

As indicated in the examples, very intimate mixing is necessary in order to obtain the high conversions at the high space rates employed. In the small reactor illustrated in Figure 2, this requires rotation of the stirrer at high velocity. In larger reactors where stirrers of larger diameter are used, a high peripheral velocity of the stirrer blades is obtained at lower R. P. M. rates. The agitation which is obtained in a commercial sulfuric acid alkylation reactor is usually sufficient to provide the necessary contact of catalyst and feed in the process of this invention.

In the practice of the invention, propylene is introduced into the reactor in liquid phase and an elevated pressure above 200 p. s. i. a. is maintained in the reactor. Both of these features are directed to facilitating contacting of propylene with the catalyst. By introducing propylene in liquid phase into the zone of violent agitation in the reactor under an elevated pressure, a high concentration of dispersed propylene in dense phase is obtained. A dispersion of liquid propylene, liquid propylene polymers and liquid acid is produced from which relatively little propylene evaporates. If the propylene were introduced in gas phase or if the reactor pressure were low, cavitation would occur in the reactor liquid. Large gas bubbles form, through which the stirrer passes without effectively dispersing the gas in the liquid with the result that poorer contact of propylene and catalyst is obtained and lower conversion results.

We claim:

1. A process for the polymerization of propylene characterized by the conversion of at least 50% of the propylene to liquid polymer in a single stage operation, said liquid polymer containing at least 50% of polymers boiling above about 350° F. which comprises maintaining a body of liquid phosphoric acid having a concentration in the range 103% to 116% orthophosphoric acid in a reaction zone, maintaining in the reaction zone a temperature in the range 225° F. to 300° F. and a superatmospheric pressure above 200 p. s. i. a., passing a liquefied normally gaseout hydrocarbon material comprising a substantial proportion of propylene into the body of liquid acid in the reaction zone at a space velocity above 0.15 volumes of liquid propylene per volume of acid per hour and intimately mixing said hydrocarbon and acid in the reaction zone.

2. A continuous process for the polymerization of propylene characterized by the conversion of at least 50% of the propylene to liquid polymer in a single stage operation, said liquid polymer containing at least 50% of polymers boiling above about 350° F., which comprises maintaining a body of liquid phosphoric acid having a concentration in the range 103-116% orthophosphoric acid in a polymerization zone, maintaining in the polymerization zone a temperature in the range 225-300° F. and a superatmospheric pressure above 200 p. s. i. a., continuously passing a liquid feed comprising a substantial proportion of liquid propylene into the polymerization zone at a space velocity above 0.15 volumes of liquid propylene per volume of acid per hour, intimately mixing the acid and feed in the polymerizing zone, continuously withdrawing the mixture of acid and feed from the polymerization zone and transferring it to a settling zone, withdrawing an upper hydrocarbon layer from the settling zone as the desired polymer product and continuously returning a lower acid layer from the settling zone to the polymerization zone.

JACOB D. KEMP.
LLOYD F. BROOKE.

REFERENCES CITED

The following references are of record in the file of this patent:

UNITED STATES PATENTS

| Number | Name | Date |
|---|---|---|
| 2,186,031 | Lyman | Jan. 9, 1940 |

OTHER REFERENCES

Ipatieff, Catalytic Reactions at High Temperatures and Pressures (MacMillan, 1937), pages 617-627.